US 11,675,243 B2

United States Patent
Wang et al.

(10) Patent No.: US 11,675,243 B2
(45) Date of Patent: *Jun. 13, 2023

(54) APPARATUS TO MAINTAIN A CONTINUOUSLY GRADED TRANSMISSION STATE

(71) Applicant: SAGE ELECTROCHROMICS, INC., Faribault, MN (US)

(72) Inventors: Yigang Wang, Plymouth, MN (US); Jean-Christophe Giron, Edina, MN (US); Bryan D. Greer, Northfield, MN (US)

(73) Assignee: SAGE ELECTROCHROMICS, INC., Faribault, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/810,546

(22) Filed: Jul. 1, 2022

(65) Prior Publication Data

US 2022/0350216 A1 Nov. 3, 2022

Related U.S. Application Data

(62) Division of application No. 16/530,850, filed on Aug. 2, 2019, now Pat. No. 11,409,179.

(Continued)

(51) Int. Cl.
*G02F 1/163* (2006.01)
*G02F 1/153* (2006.01)
(Continued)

(52) U.S. Cl.
CPC ............. *G02F 1/163* (2013.01); *G02F 1/155* (2013.01); *G02F 1/1533* (2013.01); *B60J 3/04* (2013.01);
(Continued)

(58) Field of Classification Search
CPC ........ G02F 1/163; G02F 1/1533; G02F 1/155; G02F 2001/15145; B60J 3/04; E06B 2009/2464
See application file for complete search history.

(56) References Cited

U.S. PATENT DOCUMENTS

| 4,923,289 A | 5/1990 | Demiryont |
| 5,138,481 A | 8/1992 | Demiryont |

(Continued)

FOREIGN PATENT DOCUMENTS

| CN | 104898345 A | 9/2015 |
| JP | H01277825 A | 11/1989 |

(Continued)

OTHER PUBLICATIONS

International Search Report and Written Opinion for PCT/US2019/044977, dated Nov. 28, 2019, 13 pages.

(Continued)

*Primary Examiner* — George G. King
(74) *Attorney, Agent, or Firm* — Abel Schillinger, LLP; Robert N Young

(57) ABSTRACT

An apparatus can include an electrochromic device. When using the apparatus, the electrochromic device can be switched from a first transmission state to a continuously graded state and maintained at continuously graded transmission state. An apparatus can include an active stack with a first transparent conductive layer, a second transparent conductive layer, an anodic electrochemical layer between the first and the second transparent conductive layers, and a cathodic electrochemical layer between the first and the second transparent conductive layers. The apparatus can further include a first bus bar electrically coupled to the first transparent conductive layer, a second bus bar electrically coupled to the second transparent conductive layer, where the second bus bar is generally non-parallel to the first bus (Continued)

bar, and a third bus bar electrically coupled to the first transparent conductive layer, where the third bus bar is generally parallel to the first bus bar.

20 Claims, 8 Drawing Sheets

Related U.S. Application Data

(60) Provisional application No. 62/714,424, filed on Aug. 3, 2018.

(51) Int. Cl.
*G02F 1/155* (2006.01)
*B60J 3/04* (2006.01)
*E06B 9/24* (2006.01)
*G02F 1/1514* (2019.01)

(52) U.S. Cl.
CPC ............. *E06B 2009/2464* (2013.01); *G02F 2001/15145* (2019.01)

(56) References Cited

U.S. PATENT DOCUMENTS

| | | | |
|---|---|---|---|
| 6,002,511 A | 12/1999 | Varaprasad et al. | |
| 9,341,912 B2 | 5/2016 | Shrivastava et al. | |
| 11,409,179 B2 * | 8/2022 | Wang | E06B 9/24 |
| 2003/0047457 A1 | 3/2003 | Rukavina et al. | |
| 2008/0310007 A1 | 12/2008 | Agrawal et al. | |
| 2012/0069420 A1 | 3/2012 | Suzuki | |
| 2013/0222877 A1 | 8/2013 | Greer et al. | |
| 2013/0222878 A1 | 8/2013 | Greer et al. | |
| 2013/0278988 A1 | 10/2013 | Gordon et al. | |
| 2014/0177028 A1 | 6/2014 | Shrivastava et al. | |
| 2016/0097960 A1 | 4/2016 | Dixit et al. | |
| 2016/0202591 A1 | 7/2016 | Greer | |
| 2016/0342061 A1 | 11/2016 | Pradhan et al. | |
| 2017/0130523 A1 | 5/2017 | Shrivastava et al. | |
| 2018/0196323 A1 | 7/2018 | Wang et al. | |
| 2020/0272015 A1 | 8/2020 | Wang | |

FOREIGN PATENT DOCUMENTS

| | | |
|---|---|---|
| JP | H07070218 A | 3/1995 |
| JP | 2004537755 A | 12/2004 |
| JP | 2012042814 A | 3/2012 |
| JP | 2012063657 A | 3/2012 |
| JP | 2014029556 A | 2/2014 |
| WO | 2016115166 A1 | 7/2016 |
| WO | 2018119095 A1 | 6/2018 |

OTHER PUBLICATIONS

Rushui, "PDLC Film Busbar and its wiring,", Oct. 17, 2016, Retrieved from the Internet: http://www.magic-film.com/pdlc-film-busbar-and-its-wiring/, 3 pages.

* cited by examiner

APPARATUS TO MAINTAIN A CONTINUOUSLY GRADED TRANSMISSION STATE

CROSS-REFERENCE TO RELATED APPLICATIONS

This application is a divisional and claims priority to U.S. patent application Ser. No. 16/530,850, entitled "APPARATUS TO MAINTAIN A CONTINUOUSLY GRADED TRANSMISSION STATE," by Yigang Wang et al., filed Aug. 2, 2019, which claims priority under 35 U.S.C. § 119(e) to U.S. Provisional Application No. 62/714,424, entitled "APPARATUS TO MAINTAIN A CONTINUOUSLY GRADED TRANSMISSION STATE," by Yigang Wang et al., filed Aug. 3, 2018, of which both applications are assigned to the current assignee hereof and incorporated herein by reference in their entireties.

BACKGROUND

Field of the Disclosure

The present disclosure is directed to electroactive devices, and more specifically to apparatuses including electrochromic devices and method of using the same.

Related Art

An electrochromic device can reduce the amount of sunlight entering a room or passenger compartment of a vehicle. Conventionally, all of an electrochromic device can be at a particular transmission state. For example, all of the electrochromic device may be at 0% tinting, all may be at 100% tinting, or all may be at a value between the two. A glass pane may be formed with different discrete electrochromic devices, each controlled by its own pair of bus bars. The different electrochromic devices can each be controlled to a different transmission state. For example, an electrochromic device near the top of the pane may be at 100% tinting, another electrochromic device near the bottom of the pane may be at 0% tinting, and a further electrochromic device between the other two electrochromic devices may be at 50% tinting. Further improvement in control regarding tinting of an electrochromic device is desired.

BRIEF DESCRIPTION OF THE DRAWINGS

Embodiments are illustrated by way of example and are not limited in the accompanying figures.

Figure 1:
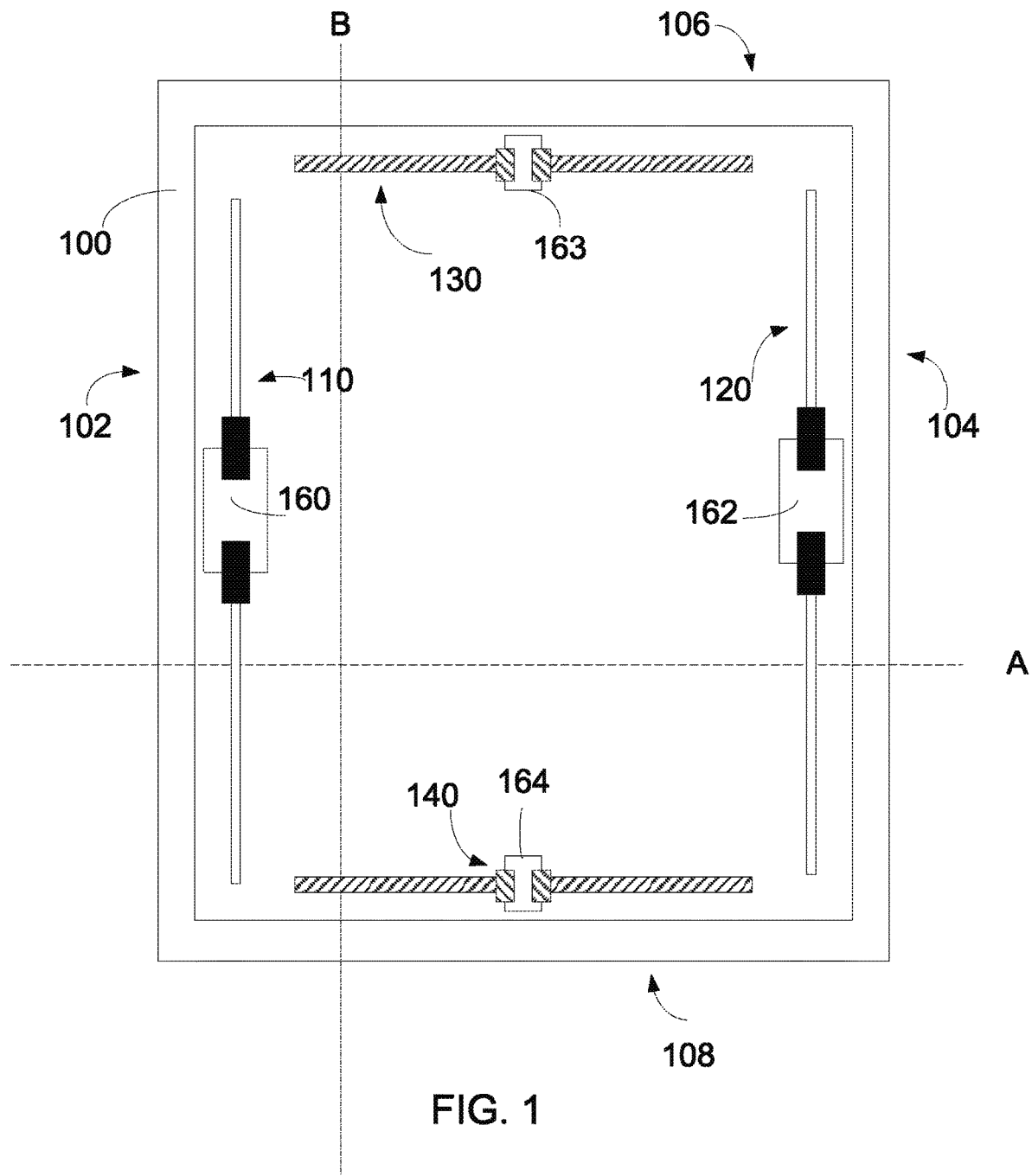
FIG. 1 includes an illustration of a top view of the substrate, a stack of layers of an electrochromic device, and bus bars, according to one embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

When referring to variables, the term "steady state" is intended to mean that an operating variable is substantially constant when averaged over 10 seconds, even through the operating variable may be change during a transient state. For example, when in steady state, an operating variable may be maintained within 10%, within 5%, or within 0.9% of an average for the operating variable for a particular mode of operation for a particular device. Variations may be due to imperfections in an apparatus or supporting equipment, such as noise transmitted along voltage lines, switching transistors within a control device, operating other components within an apparatus, or other similar effects. Still further, a variable may be changed for a microsecond each second, so that a variable, such as voltage or current, may be read; or one or more of the voltage supply terminals may alternate between two different voltages (e.g., 1V and 2V) at a frequency of 1 Hz or greater. Thus, an apparatus may be at steady state even with such variations due to imperfections or when reading operating parameters. When changing between modes of operation, one or more of the operating variables may be in a transient state. Examples of such variables can include voltages at particular locations within an electrochromic device or current flowing through the electrochromic device.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An electrochromic device can be maintained in a continuously graded transmission state for nearly any time period, for example, such as beyond the time needed for switching between states. When continuously graded, the electrochromic device can have a relatively higher electrical field between bus bars at an area with relatively less transmission and a relatively lower electrical field between the bus bars at another area with relative greater transmission. The continuous grading allows for a more visibly pleasing transition between less transmission to greater transmission, as compared to discrete grading. The varying locations of the bus bars can provide voltages that can range from fully bleached (highest transmission) to fully tinted (lowest transmission state), or anything in between. Still further, the electrochromic device can be operated with a substantially uniform transmission state across all of the area of the electrochromic device, with a continuously graded transmission state across all of the area of the electrochromic device, or with a combination of a portion with a substantially uniform transmission state and another portion with a continuously graded transmission state.

Many different patterns for the continuously graded transmission state can be achieved by the proper selection of bus bar location, the number of voltage supply terminals coupled to each bus bar, locations of voltage supply terminals along the bus bars, or any combination thereof. In another embodiment, gaps between bus bars can be used to achieve a continuously graded transmission state.

The electrochromic device can be used as part of a window for a building or a vehicle. The electrochromic device can be used within an apparatus. The apparatus can further include an energy source, an input/output unit, and a control device that controls the electrochromic device. Components within the apparatus may be located near or remotely from the electrochromic device. In an embodiment, one or more of such components may be integrated with environmental controls within a building.

The embodiments as illustrated in the figures and described below help in understanding particular applications for implementing the concepts as described herein. In the description below, an electrochromic device will be described as operating with voltages on bus bars being in a range of 0V to 50V. In one embodiment, the voltages can be between 0V and 25V. In another embodiment, the voltages can be between 0V and 10V. In yet another embodiment, the voltages can be between 0V and 3V. Such description is used to simplify concepts as described herein. Other voltage may be used with the electrochromic device or if the composition or thicknesses of layers within an electrochromic stack are changed. The voltages on bus bars may both be positive (0.1V to 50V), both negative (−50V to −0.1V), or a combination of negative and positive voltages (−1V to 2V), as the voltage difference between bus bars are more important than the actual voltages. Furthermore, the voltage difference between the bus bars may be less than or greater than 50V. After reading this specification, skilled artisans will be able to determine voltage differences for different operating modes to meet the needs or desires for a particular application. The embodiments are exemplary and not intended to limit the scope of the appended claims.

FIG. 1 includes an illustration of a top view of a substrate 100, a stack of layers of an electrochromic device, and bus bars, according to one embodiment. A first bus bar 110 may be along a first side 102 of the substrate 100, and a second bus bar 120 can be along a second side 104 that is opposite the first side 202. In one embodiment, the first side 102 is generally parallel to the second side 104. In one embodiment, the substrate 100 can include a third side 106 generally orthogonal to the first side 102. In another embodiment, the substrate 100 can include a fourth side 108 opposite the third side 106 and generally parallel to the third side 106. Each of the bus bars 110 and 120 have lengths that extend a majority of the distance between the third side 106 and the fourth side 108 that is opposite the third side 106. A third bus bar 130 may be along the third side 106 of the substrate 100 and a fourth bus bar 140 can be along the fourth side 108 of the substrate 100. Each of the bus bars 130 and 140 have lengths that extend a majority of the distance between the first side 102 and the second side 104. In one embodiment, the first bus bar 110 and the second bus bar 120 are generally parallel each other. As used herein, substantially parallel is intended to mean that the two bus bars can be within 10 degrees of each other, such as within 5 degrees of each other, such as within 4 degrees of each other, such as within 2 degrees of each other, or such as within 1 degree of each other. As will be discuss in more detail below with respect to FIG. 2 and FIG. 3, the first bus bar 110 and the second bus bar 120 can both be electrically connected to a first transparent conductive layer while the third bus bar 130 and the fourth bus bar 140 can be connected to a second transparent conductive layer.

In one embodiment, the first bus bar 110 can be connected to a first voltage supply terminal 160, the second bus bar 120 can be connected to a second voltage supply terminal 162, the third bus bar 130 can be connected to a third voltage supply terminal 163, and the fourth bus bar 140 can be connected to a fourth voltage supply terminal 164. In one embodiment, the voltage supply terminals can be connected to each bus bar 110, 120, 130, and 140 about the center of each bus bar. In one embodiment, each bus bar 110, 120, 130, and 140 can have one voltage supply terminal. The ability to control each voltage supply terminal 160, 162, 163, and 164 provide for control over grading of light transmission through the electrochromic device 124.

In one embodiment, the first voltage supply terminal 160 can set the voltage for the first bus bar 110 at a value less than the voltage set by the voltage supply terminal 163 for the third bus bar 130. In another embodiment, the voltage supply terminal 163 can set the voltage for the third bus bar 130 at a value greater than the voltage set by the voltage supply terminal 164 for the fourth bus bar 140. In another embodiment, the voltage supply terminal 163 can set the voltage for the third bus bar 130 at a value less than the voltage set by the voltage supply terminal 164 for the fourth bus bar 140. In another embodiment, the voltage supply terminal 160 can set the voltage for the first bus bar 110 at a value about equal to the voltage set by the voltage supply terminal 162 for the second bus bar 120. In one embodiment, the voltage supply terminal 160 can set the voltage for the first bus bar 110 at a value within about 0.5V, such as 0.4V, such as 0.3V, such as 0.2V, such as 0.1V to the voltage set by the voltage supply terminal 162 for the second bus bar 120. In a non-limiting example, the first voltage supply terminal 160 can set the voltage for the first bus bar 110 at 0V, the second voltage supply terminal 162 can set the voltage for the second bus bar 120 at 0V, the third voltage supply terminal 163 can set the voltage for the third bus bar 130 at 3V, and the fourth voltage supply terminal 164 can set the voltage for the fourth bus bar 140 at 1.5V.

Figure 2:
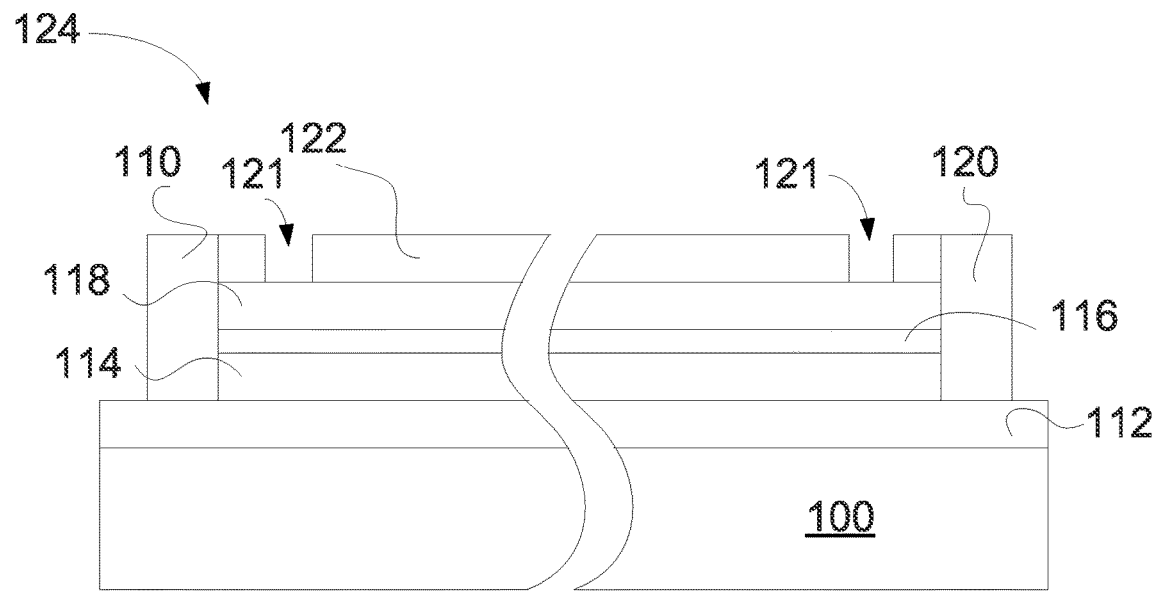
FIG. 2 includes an illustration of a cross-sectional view along line A of a portion of a substrate, a stack of layers for an electrochromic device, and bus bars, according to one embodiment.

FIG. 2 includes an illustration of a cross-sectional view along line A of a portion of a substrate 100, a stack of layers 112, 114, 118, and 122 for an electrochemical device 124, and bus bars, according to one embodiment. In one embodiment, the electrochemical device 124 is an electrochromic device. The electrochemical device 124 can include a first transparent conductive layer 112, a cathodic electrochemical layer 114, an anodic electrochemical layer 118, and a second transparent conductive layer 122. In one embodiment, the electrochromic device 124 can also include an ion conducting layer 116 between the cathodic electrochemical layer 114 and the anodic electrochemical layer 118. In one embodiment, the first transparent conductive layer 112 can be between the substrate 100 and the cathodic electrochemical layer 114. The cathodic electrochemical layer 114 can be between the first transparent conductive layer 112 and the anodic electrochemical layer 118. In one embodiment, the anodic electrochemical layer 118 can be between the cathodic electrochemical layer 114 and the second transparent conductive layer 122.

The substrate 100 can include a glass substrate, a sapphire substrate, an aluminum oxynitride substrate, a spinel substrate, or a transparent polymer. In a particular embodiment, the substrate 100 can be float glass or a borosilicate glass and have a thickness in a range of 0.025 mm to 4 mm thick. In another particular embodiment, the substrate 100 can include ultra-thin glass that is a mineral glass having a thickness in a range of 10 microns to 300 microns. The first transparent conductive layers 112 and second transparent conductive layer 122 can include a conductive metal oxide or a conductive polymer. Examples can include a indium oxide, tin oxide or a zinc oxide, either of which can doped with a trivalent element, such as Sn, Sb, Al, Ga, In, or the like, or a sulfonated polymer, such as polyaniline, polypyrrole, poly(3,4-ethylenedioxythiophene), or the like or one or several metal layer(s) or a metal mesh or a nanowire mesh or graphene or carbon nanotubes or a combination thereof. The transparent conductive layers 112 and 122 can have the same or different compositions.

The cathodic electrochemical layer 114 and the anodic electrochemical layer 118 can be electrode layers. In one embodiment, the cathodic electrochemical layer 114 can be an electrochromic layer. In another embodiment, the anodic electrochemical layer 118 can be a counter electrode layer. The electrochromic layer can include an inorganic metal oxide electrochemically active material, such as $WO_3$, $V_2O_5$, $MoO_3$, $Nb_2O_5$, $TiO_2$, $CuO$, $Ir_2O_3$, $Cr_2O_3$, $Co_2O_3$, $Mn_2O_3$, or any combination thereof and have a thickness in a range of 20 nm to 2000 nm. The counter electrode layer can include any of the materials listed with respect to the electrochromic layer and may further include nickel oxide (NiO, $Ni_2O_3$, or combination of the two) or iridium oxide, and Li, Na, H, or another ion and have a thickness in a range of 20 nm to 1000 nm. The ion conductive layer 116 (sometimes called an electrolyte layer) can be optional and can have a thickness in a range of 1 nm to 1000 nm in case of an inorganic ion conductor or 5 microns to 1000 microns in case of an organic ion conductor. The ion conductive layer 116 can include a silicate with or without lithium, aluminum, zirconium, phosphorus, boron; a borate with or without lithium; a tantalum oxide with or without lithium; a lanthanide-based material with or without lithium; another lithium-based ceramic material particularly LixMOyNz where M is one or a combination of transition metals or the like.

In one embodiment, the first bus bar 110 and the second bus bar 120 are electrically connected to the first transparent conductive layer 112, as seen along line A. In one embodiment, the first transparent conductive layers 112 includes portions removed, so that the first bus bar 110 and the second bus bar 120 are not electrically connected to third bus bar 130 and the fourth bus bar 140. Such removed portions are typically 20 nm to 2000 nm wide. In another embodiment, the third bus bar 130 and the fourth bus bar 140 are electrically connected to the first transparent conductive layer 112. In one embodiment, the first bus bar 110 is on one side of the stack of layers of the electrochemical device 124 and the second bus bar 120 is on the opposite side of the stack of layers of the electrochemical device 124. In a particular embodiment, the first bus bar 110 and the second bus bar 120 can be electrically connected to the cathodic electrochemical layer 114 via the first transparent conductive layer 112. In a particular embodiment, the first bus bar 110 and the second bus bar 120 can be electrically connected to the anodic electrochemical layer 118 via the second transparent conductive layer 122.

Figure 3:
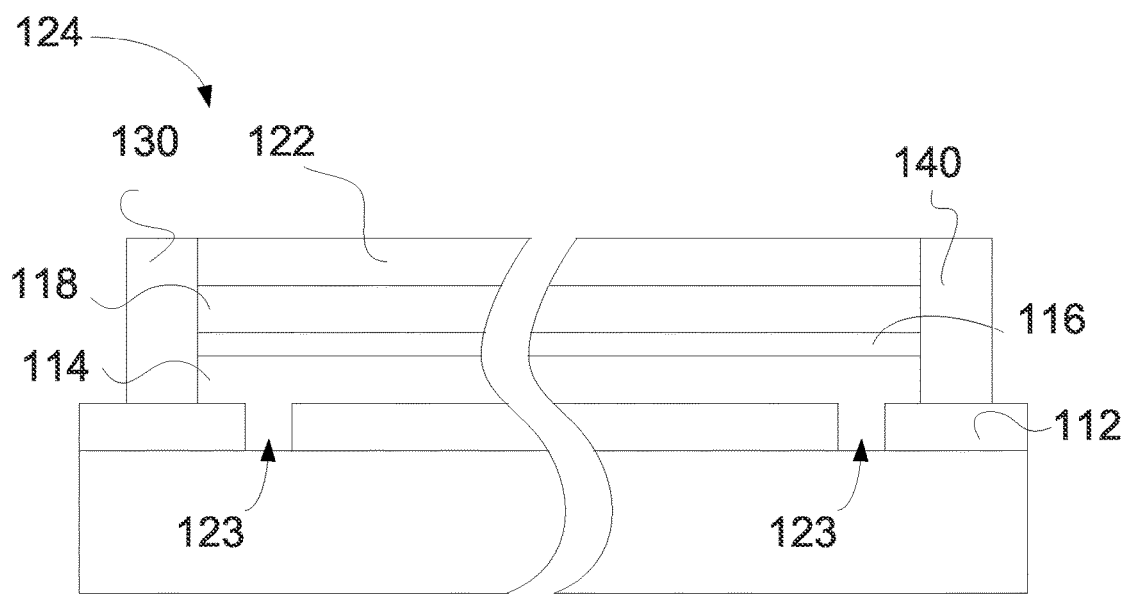
FIG. 3 includes an illustration of a cross-sectional view along line B of a portion of a substrate, a stack of layers for an electrochromic device, and bus bars, according to one embodiment.

FIG. 3 includes an illustration of a cross-sectional view along line B of a portion of the substrate 100, the stack of layers 112, 114, 118, and 122 for the electrochemical device 124, and bus bars, according to one embodiment. In one embodiment, the third bus bar 130 and the fourth bus bar 140 are electrically connected to the second transparent conductive layer 122, as seen along line B. In one embodiment, the second transparent conductive layers 122 includes portions removed, so that the third bus bar 130 and the fourth bus bar 140 are not electrically connected to first bus bar 110 and the second bus bar 120. Such removed portions are typically 20 nm to 2000 nm wide. In another embodiment, the first bus bar 110 and the second bus bar 120 are electrically connected to the second transparent conductive layer 122. In one embodiment, the third bus bar 130 is on one side of the stack of layers of the electrochemical device 124 and the fourth bus bar 140 is on the opposite side of the stack of layers of the electrochemical device 124. In a particular embodiment, the third bus bar 130 and the fourth bus bar 140 can be electrically connected to the anodic electrochemical layer 118 via the second transparent conductive layer 122. In a particular embodiment, the third bus bar 130 and the fourth bus bar 140 can be electrically connected to the cathodic electrochemical layer 114 via the second transparent conductive layer 122.

The first bus bar 110, the second bus bar 120, the third bus bar 130, and the fourth bus bar 140 can include a conductive material. In an embodiment, each of the bus bars 110, 120, 130, and 140 can be formed using a conductive ink, such as a silver frit, which is printed over the transparent conductive layer 122. In another embodiment, one or more of the bus bars 110, 120, 130, and 140 can include a metal-filled polymer, such as a silver-filled epoxy.

Figures 4, 5:
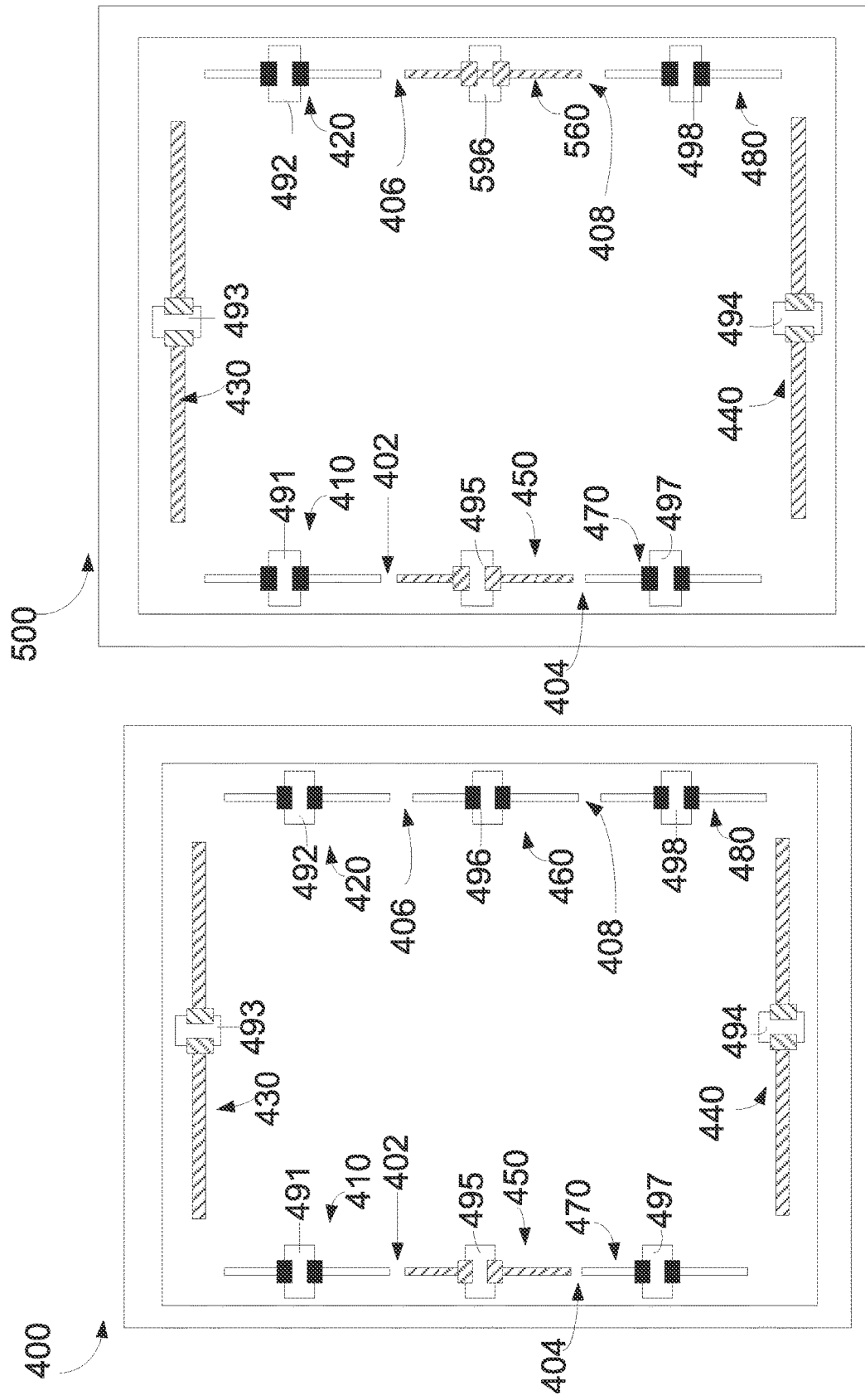
FIG. 4 includes an illustration of a top view of the substrate, a stack of layers of an electrochromic device, and bus bars, according to one embodiment.
FIG. 5 includes an illustration of a top view of the substrate, a stack of layers of an electrochromic device, and bus bars, according to one embodiment.

The number of bus bars is not limited to configuration as shown in FIG. 1. FIG. 4 includes an illustration of a top view of the substrate 100, a stack of layers 112, 114, 118, and 122 of an electrochromic device 400, and bus bars, according to one embodiment. As seen in FIG. 4, the electrochemical device 400 can include more than three bus bars, such as more than four bus bars, such as more than five bus bars, such as more than six bus bars, such as more than seven bus bars. The electrochemical device 400 can include a first bus bar 410, a second bus bar 420, a third bus bar 430, a fourth bus bar 440, a fifth bus bar 450, a sixth bus bar 460, a seventh bus bar 470, and an eighth bus bar 480, a first voltage supply terminal 491, a second voltage supply terminal 492, a third voltage supply terminal 493, a fourth voltage supply terminal 494, a fifth voltage supply terminal 495, a sixth voltage supply terminal 496, a seventh voltage supply terminal 497, an eighth voltage supply terminal 498, a first gap 402, a second gap 404, a third gap 406, a fourth gap 408. In one embodiment, the first bus bar 410, the second bus bar 420, the sixth bus bar 460, the seventh bus bar 470, and the eighth bus bar 480 can be connected to a first transparent conductive layer while the third bus bar 430, the fourth bus bar 440, and the fifth bus bar 450 can be connected to a second transparent conductive layer. In one embodiment, the third voltage supply terminal 493 can set the voltage for the third bus bar 430 at a value greater than the voltage set by the first voltage supply terminal 491 for the first bus bar 410.

In one embodiment, the first bus bar 410 can be closer to a first side of the substrate 102 than the second side of the substrate 104. In another embodiment, the fifth bus bar 450 can be between the first bus bar 410 and the seventh bus bar 470. In another embodiment, the second bus bar 420 can be closer to the second side of the substrate 104 than the first side of the substrate 102. In one embodiment, the sixth bus bar 460 is between the second bus bar 420 and the eighth bus bar 480. In another embodiment, the third bus bar 430 is closer to the third side 106 of the substrate than the fourth side 108. In one embodiment, the fourth bus bar 440 is closer to the fourth side 108 of the substrate than the third side 106. In one embodiment, the third bus bar 430 can be substantially parallel to the fourth bus bar 440. In one embodiment, the third bus bar 430 can be generally non-parallel to the first bus bar 410. In one embodiment, the third bus bar 430 can be orthogonal to the first bus bar 410. In one embodiment, the first bus bar 410 can be substantially parallel to the second bus bar 420. In one embodiment, the seventh bus bar 470 can be closer to the fourth bus bar 440 than the third bus bar 430. In another embodiment, the second bus bar 420 can be closer to the third bus bar 430 than the fourth bus bar 440. The first gap 402 can be between the first bus bar 410 and the fifth bus bar 450. The second gap 404 can be between the fifth bus bar 450 and the seventh bus bar 470. The third gap can be between the second bus bar 420 and the sixth bus bar 460. The fourth gap 408 can be between the sixth bus bar 460 and the eighth bus bar 480. The transparent conductive layers can have a linear resistance (ohms/meter) that is approximately ten times the linear resistance of the bus bars. Gaps between bus bars can allow the transparent conductive layer to act as a resistor between the gaps and allow a continuously graded state to be maintained in the gaps under the bus bars. The gaps 402, 404, 406, 408 can be substantially the same lengths. In one embodiment, the gaps 402, 404, 406, 408 can be different from one another. In another embodiment, the gaps 402 and 406 can be substantially the same length but have a different length than gap 404.

In one embodiment, the voltage supply terminals 491, 492, 493, 494, 495, 496, 497, and 498 can set their respective bus bars to voltages such that the third bus bar 430 is greater than the fifth bus bar 450 is greater than the fourth bus bar 440 is greater than the first bus bar 410 (430>450>440>410). In another embodiment, the voltage supply terminals 491, 492, 493, 494, 495, 496, 497, and 498 can set their respective bus bars to voltages such that the fourth bus bar 440>the fifth bus bar 450>third bus bar 430>the first bus bar 410 (440>450>430>410). In another embodiment, the first voltage supply terminal 491 can set the voltage for the first bus bar 410 at a value about equal to the voltage set by the voltage supply terminals 492, 496, 497, 498 for the second bus bar 420, sixth bus bar 460, seventh bus bar 470, and eighth bus bar 480. In one embodiment, first voltage supply terminal 491 can set the voltage for the first bus bar 410 at a value within about 0.5V, such as 0.4V, such as 0.3V, such as 0.2V, such as 0.1V to the voltage set by the voltage supply terminals 492, 496, 497, 498 for the second bus bar 420, sixth bus bar 460, seventh bus bar 470, and eight bus bar 480.

In one embodiment, the electrochemical device 400 can include a first zone, a second zone, and a third zone. The first zone can be defined by the first voltage supply terminal 491 and first bus bar 410, the second voltage supply terminal 492 and second bus bar 420, and the third voltage supply terminal 493 and third bus bar 430. The second zone can be defined by the fifth voltage supply terminal 495 and fifth bus bar 450, and the sixth voltage supply terminal 496 and sixth bus bar 460. The third zone can be defined by and the fourth voltage supply terminal 494 and fourth bus bar 440, the seventh voltage supply terminal 497 and seventh bus bar 470, and the eighth voltage supply terminal 498 and eighth bus bar 480. In operation, zone one, zone two, and zone three can have different tinting states. In a non-limiting example, the third voltage supply terminal 493 can set the voltage for the third bus bar 430 at 3V, the fifth voltage supply terminal 495 can set the voltage for the fifth bus bar 450 at 1.5V, the fourth voltage supply terminal 494 can set the voltage for the fourth bus bar 440 at 0.5V, the first voltage supply terminal 491 can set the voltage for the first bus bar 410 at 0V, the second voltage supply terminal 492 can set the voltage for the second bus bar 420 at 0V, the sixth voltage supply terminal 496 can set the voltage for the sixth bus bar 460 at 0V, the seventh voltage supply terminal 497 can set the voltage for the seventh bus bar 470 at 0V, and the eight voltage supply terminal 498 can set the voltage for the eighth bus bar 480 at 0V. By doing so, zone 1 can be at full tint, zone three can be at a clear state, and zone two can be between a full tint and clear state such that the entire electrochromic device appears continuously graded.

In another embodiment, as seen in FIG. 5, the first bus bar 410, the second bus bar 420, the seventh bus bar 470, and the eighth bus bar 480 can be connected to a first transparent conductive layer while the third bus bar 430, the fourth bus bar 440, the fifth bus bar 450, and the sixth bus bar 560 can be connected to a second transparent conductive layer. In one embodiment, the electrochemical device 500 can include a first zone, a second zone, a third zone, a fourth zone, and a fifth zone. The first zone can be defined by the first voltage supply terminal 491 and first bus bar 410, the second voltage supply terminal 492 and second bus bar 420, and the third voltage supply terminal 493 and third bus bar 430. The second zone can be defined by the fifth voltage supply terminal 495 and fifth bus bar 450, and the sixth voltage supply terminal 496 and sixth bus bar 460. The third zone can be defined by and the fourth voltage supply terminal 494 and fourth bus bar 440, the seventh voltage supply terminal 497 and seventh bus bar 470, and the eighth voltage supply terminal 498 and eighth bus bar 480. The fourth zone can be defined by the first gap 402 and the third gap 406. The fifth zone can be defined by the second gap 404 and the fourth gap 408. In operation, zone one, zone two, zone three, zone four, and zone five can have different tinting states. In a non-limiting example, the third voltage supply terminal 493 can set the voltage for the third bus bar 430 at 3V, the fifth voltage supply terminal 495 can set the voltage for the fifth bus bar 450 at 1.5V, the sixth voltage supply terminal 496 can set the voltage for the sixth bus bar 460 at 1.5V, the fourth voltage supply terminal 494 can set the voltage for the fourth bus bar 440 at 0.5V, the first voltage supply terminal 491 can set the voltage for the first bus bar 410 at 0V, the second voltage supply terminal 492 can set the voltage for the second bus bar 420 at 0V, the seventh voltage supply terminal 497 can set the voltage for the seventh bus bar 470 at 0V, and the eight voltage supply terminal 498 can set the voltage for the eighth bus bar 480 at 0V. By doing so, zone 1 can be at full tint, zone three can be at a clear state, and zone two can be between a full tint and clear state such that the entire electrochromic device can include two graded zones, zones four and five.

Figure 6:
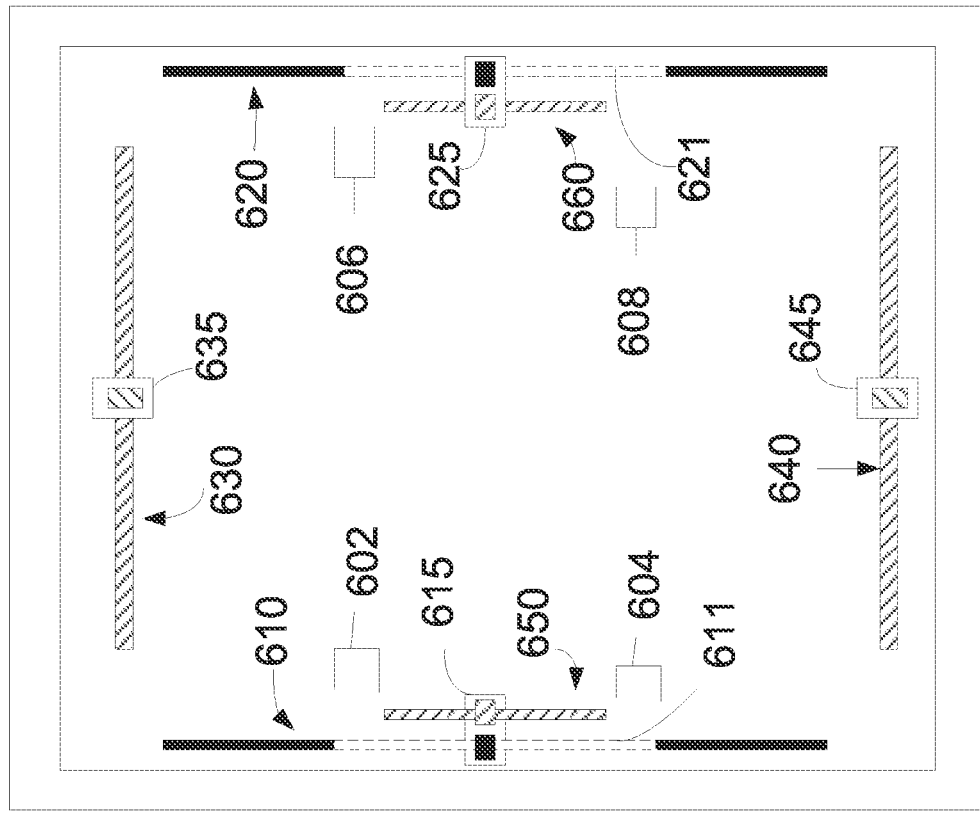
FIG. 6 includes an illustration of a top view of the substrate, a stack of layers of an electrochromic device, and bus bars, according to one embodiment.

FIG. 6 includes an illustration of a top view of the substrate 100, a stack of layers of an electrochemical device, and bus bars, according to one embodiment. The electrochemical device can include a first bus bar 610, a second bus bar 620, a third bus bar 630, a fourth bus bar 640, a fifth bus bar 650, a sixth bus bar 660, a first voltage supply terminal 615, a second voltage supply terminal 625, a third voltage supply terminal 635, and a fourth voltage supply terminal 645. The first bus bar 610 and the second bus bar 620 can be electrically connected to a first transparent conductive layer while the third bus bar 630, the fourth bus bar 640, the fifth bus bar 650, and the sixth bus bar 660 can be connected to a second transparent conductive layer. The first voltage supply terminal 615 can control the voltages for both the first bus bar 610 and the fifth bus bar 650. The second voltage supply terminal 625 can control the voltages for both the second bus bar 620 and the sixth bus bar 660. In one embodiment, the first bus bar 610 is closer to the first side 102 of the substrate than the second side 104. The fifth bus bar 650 can be generally parallel to the first bus bar 610. The fifth bus bar 650 can be between the first bus bar 610 and the sixth bus bar 660. In one embodiment, the fifth bus bar 650 is closer to the first bus bar 610 than the sixth bus bar 660. In one embodiment, the second bus bar 620 can be closer to the second side 104 of the substrate 100 than the first side 102. The sixth bus bar 660 can be between the second bus bar 620 and the first bus bar 610. The sixth bus bar 660 can be closer to the second bus bar 620 than the first bus bar 610. The third bus bar 630 can be non-parallel to the first bus bar 610. In one embodiment, the third bus bar 630 can be generally orthogonal to the first bus bar 610. The fourth bus bar 640 can be parallel to the third bus bar 630. In one embodiment, the fourth bus bar 640 can be closer to the fourth side 108 than the third side 106.

In one embodiment, the first bus bar 610 can include an area of electrical isolation 611 from the stack of layers of the electrochemical device. In one embodiment, the second bus bar 620 can include an area of electrical isolation 621 from the stack of layers of the electrochemical device. In one embodiment, the area of isolation 611 is parallel to the fifth bus bar 650. In one embodiment, the area of isolation 611 extends a length greater than the length of the fifth bus bar 650 creating a gap 602 between the end of the first bus bar 610 and the end of the fifth bus bar 650. In one embodiment, the area of isolation 621 is parallel to the sixth bus bar 660. In one embodiment, the area of isolation 621 extends a length greater than the length of the sixth bus bar 660. In one embodiment, the third voltage supply terminal 635 can set the voltage for the third bus bar 630 at a value greater than the voltage set by the fifth voltage supply terminal 615 for the fifth bus bar 650. The fifth voltage supply terminal 615 can set the voltage for the fifth bus bar 650 at a value greater than the voltage set by the fourth voltage supply terminal 645 for the fourth bus bar 640. By doing so, the voltage supply terminal can create a gradient at gap 602, 604, 606, and 608.

Figure 7:
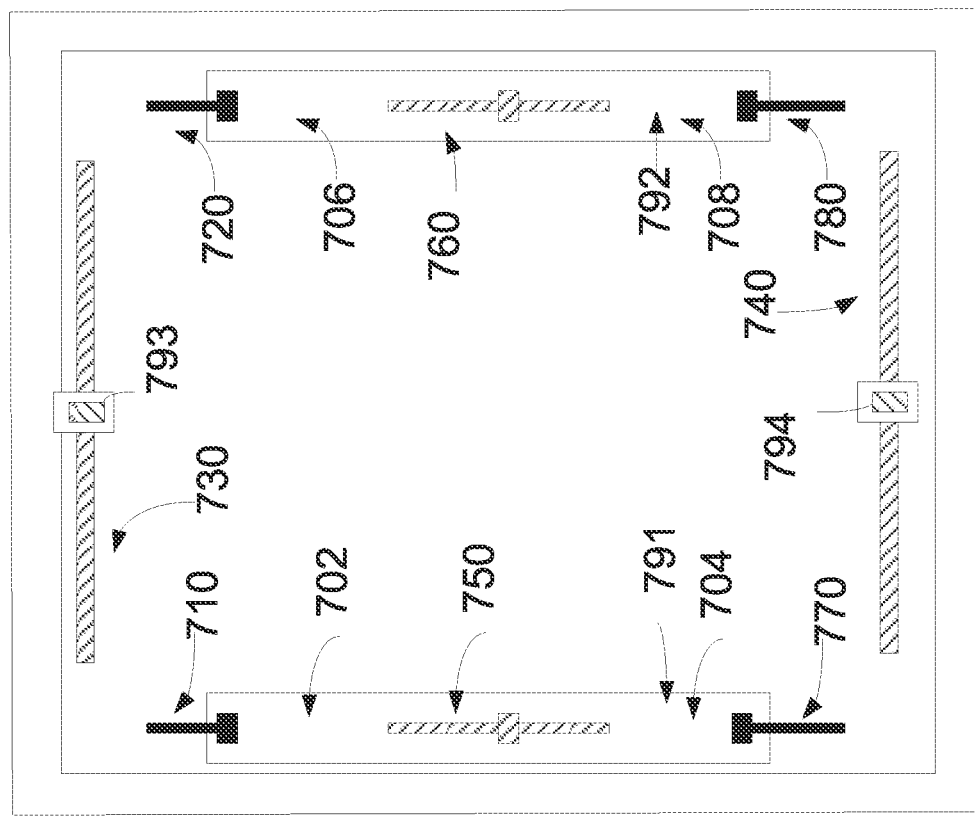
FIG. 7 includes an illustration of a top view of the substrate, a stack of layers of an electrochromic device, and bus bars, according to one embodiment.

In another embodiment, as seen in FIG. 7, the first bus bar 710 and the second bus bar 720 can be connected to a first transparent conductive layer while the third bus bar 730, the fourth bus bar 740, the fifth bus bar 750, the sixth bus bar 760, the seventh bus bar 770, and the eighth bus bar 780 can be connected to a second transparent conductive layer. In one embodiment, the electrochemical device 700 can include a first zone, a second zone, a third zone, a fourth zone, and a fifth zone. The first zone can be defined by the first voltage supply terminal 791 and first bus bar 710, the second voltage supply terminal 792 and second bus bar 720, and the third voltage supply terminal 793 and third bus bar 730. The second zone can be defined by the first voltage supply terminal 791 and fifth bus bar 750, and the second voltage supply terminal 792 and sixth bus bar 760. The third zone can be defined by the first voltage supply terminal 791 and first bus bar 770, the second voltage supply terminal 792 and eighth bus bar 780, and the fourth voltage supply terminal 794 and fourth bus bar 740. The fourth zone can be defined by the first gap 702 and the third gap 706. The fifth zone can be defined by the second gap 704 and the fourth gap 708. In operation, the first voltage supply terminal can control the voltages to the first and fifth bus bars, the second voltage supply terminal can control the voltages to the second bus bar and the sixth bus bar, the third voltage supply terminal can control the voltage to the third bus bar, and the fourth voltage supply terminal can control the voltage to the fourth bus bar. In one implementation, the voltage applied to the third bus bar can be greater than the voltage applied to the fourth bus bar which can be greater than the voltage applied to sixth bus bar which can be greater than the voltage applied to the first bus bar.

Figure 8:
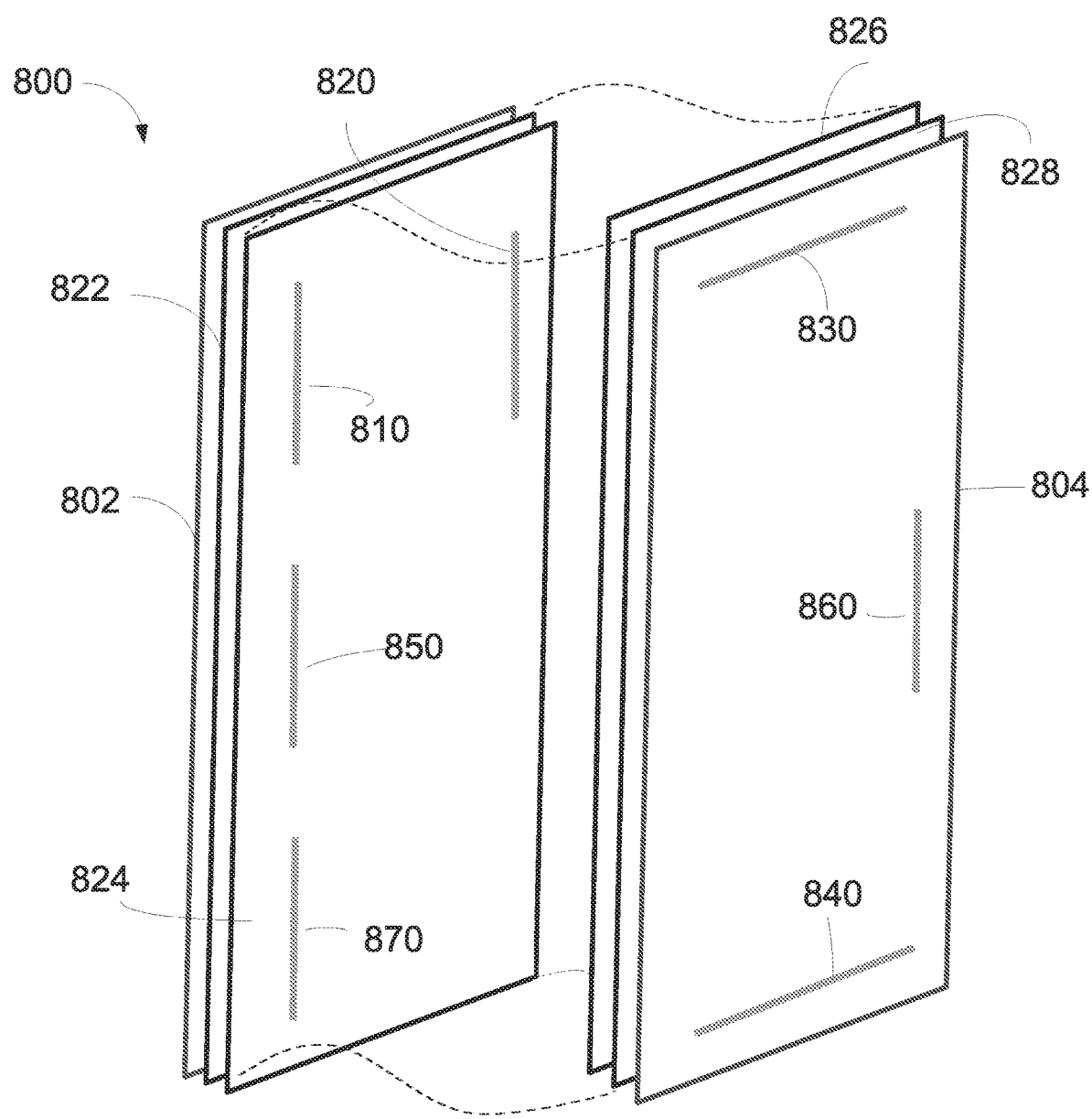
FIG. 8 includes an illustration of a perspective view of a partially disassembled structure in accordance with another embodiment.

FIG. 8 includes an illustration of a perspective view of a partially disassembled structure 800 in accordance with another embodiment. The structure 800 includes substrates 802 and 804, transparent conductive layers 822 and 828, and cathodic electrochemical layer 824 and anodic electrochemical layer 826. An ion conductive layer can be present but is not illustrated in FIG. 8. The compositions of the transparent conductive layers 822 and 828, the cathodic electrochemical layer 824 and anodic electrochemical layer 826, and the ion conductive layer can have the compositions as previously described and polymer-based compositions. A first bus bar 810, a second bus bar 820, a fifth bus bar 850, a seventh bus bar 870 can be formed on the substrate 802 before forming any of the subsequent layers, and the third bus bar 830, the fourth bus bar 840, and the sixth bus bar 860 can be formed on the layer 828 before the substrate 804 is joined with the substrate 802. Gaps can be present between the bus bars. During operation, the bus bars on the substrate 802 can be at a fixed potential, such as 0 V, and the bus bars on the substrate 804 can have their voltages selected to achieve a desired light transmission state. In another embodiment, the bus bars on the substrate 804 can be at a fixed potential, such as 0V, and bus bars on the substrate 802 can have their voltages selected to achieve a desired light transmission state. In one embodiment, the voltage of the third bus bar 830 is greater than the voltage of the sixth bus bar 860 which is greater than the voltage of the fourth bus bar 840. In another embodiment, the voltage of the fourth bus bar 840 is greater than the voltage of the sixth bus bar 860 which is greater than the voltage of the third bus bar 830.

Figure 9:
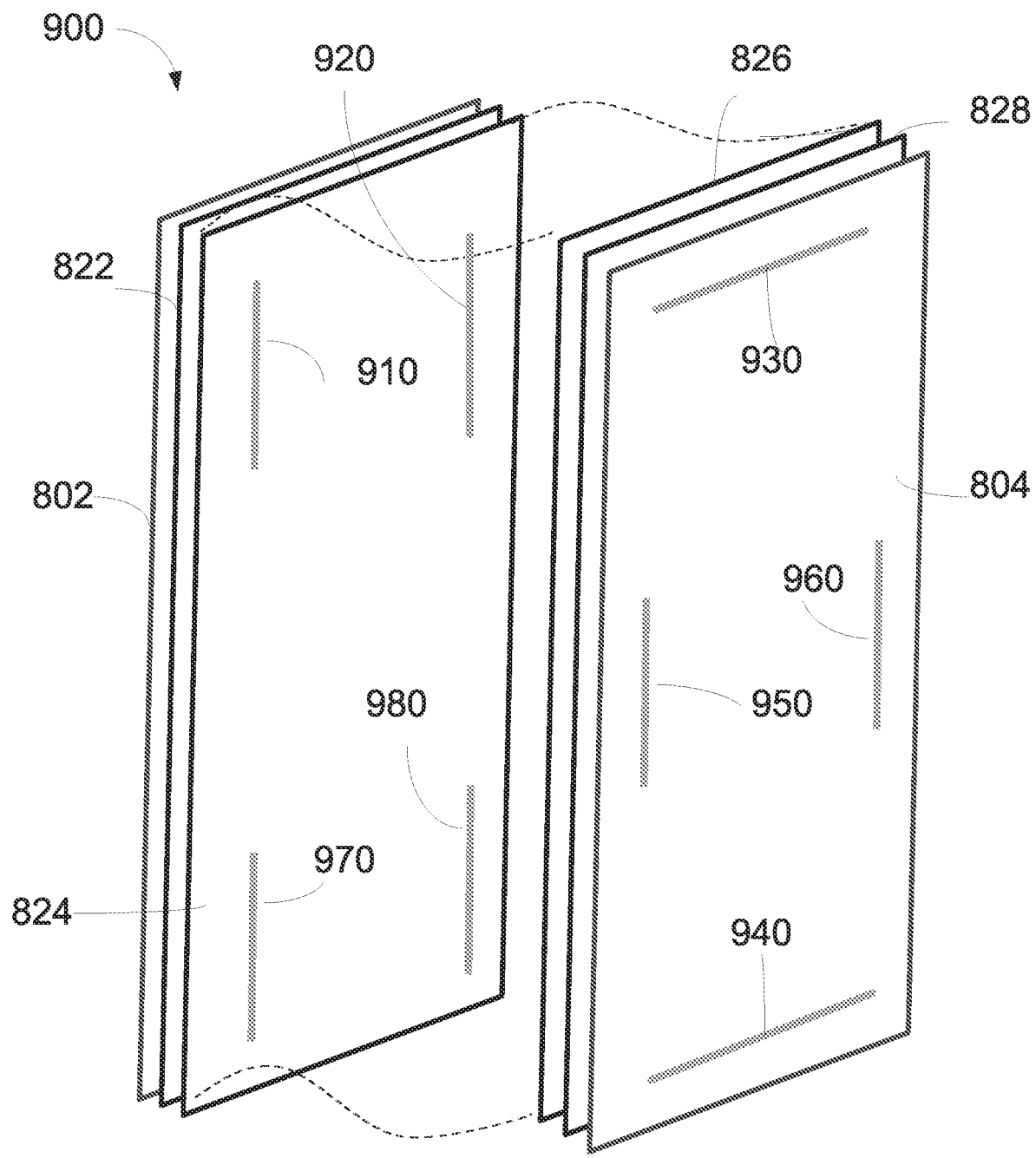
FIG. 9 includes an illustration of a perspective view of a partially disassembled structure in accordance with another embodiment.

FIG. 9 includes an illustration of a perspective view of a partially disassembled structure 900 in accordance with another embodiment. A first bus bar 910, a second bus bar 920, a seventh bus bar 970, and an eight bus bar 980 can be formed on the substrate 802 before forming any of the subsequent layers, and the third bus bar 930, the fourth bus bar 940, the fifth bus bar 950, and the sixth bus bar 860 can be formed on the layer 828 before the substrate 804 is joined with the substrate 802. Gaps can be present between the bus bars. During operation, the bus bars on the substrate 802 can be at a fixed potential, such as 0V, and the bus bars on the substrate 804 can have their voltages selected to achieve a desired light transmission state. In another embodiment, the bus bars on the substrate 804 can be at a fixed potential, such as 0V, and bus bars on the substrate 802 can have their voltages selected to achieve a desired light transmission state. In one embodiment, the voltage of the third bus bar 930 is greater than the voltage of the fifth bus bar 950 which is greater than the voltage of the fourth bus bar 940, which is greater than the first bus bar 910. In another embodiment, the voltage of the fourth bus bar 940 is greater than the voltage of the fifth bus bar 950 which is greater than the voltage of the third bus bar 930 which is greater than the voltage of the first bus bar 910.

Figure 10:
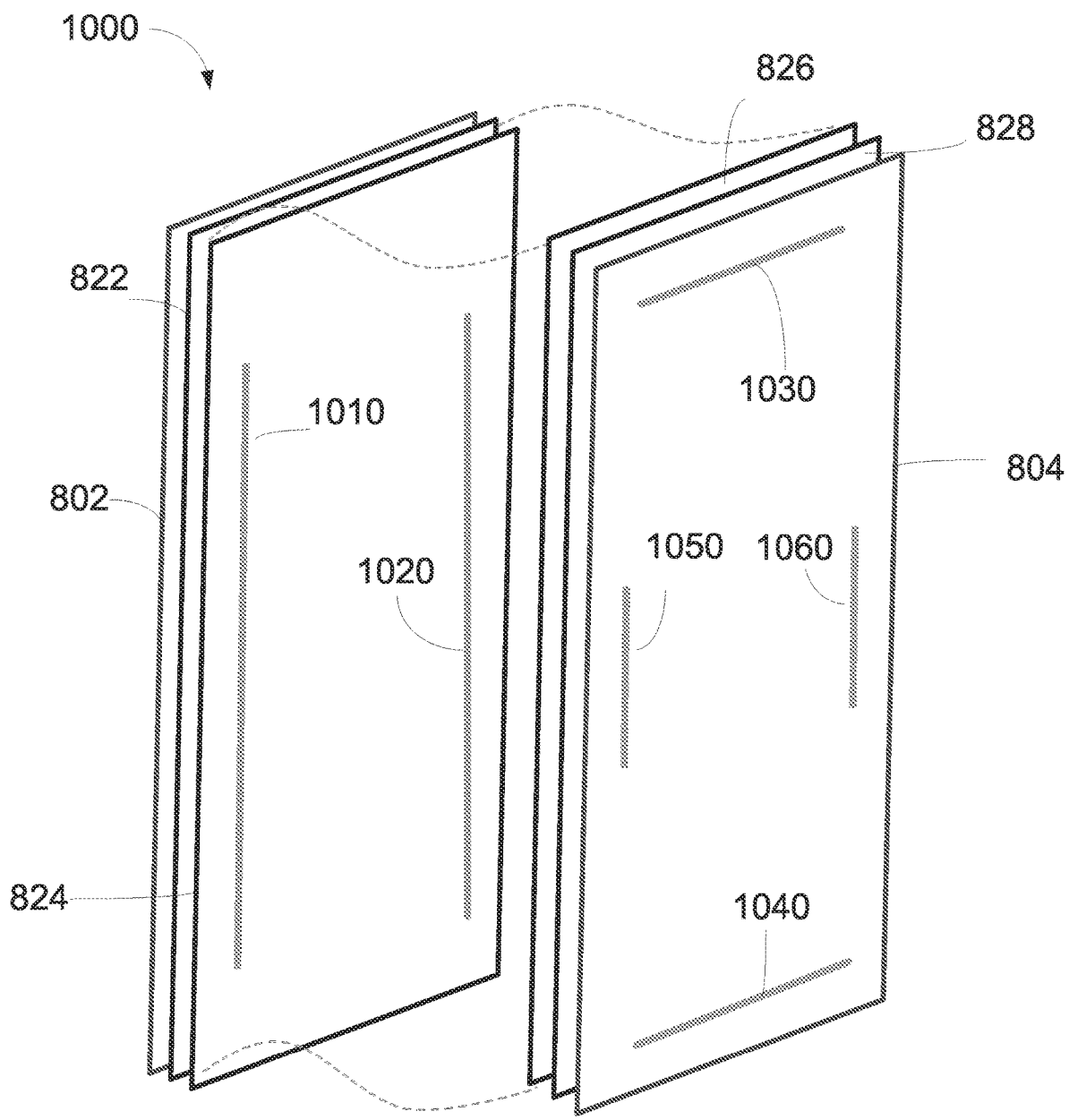
FIG. 10 includes an illustration of a perspective view of a partially disassembled structure in accordance with another embodiment.

FIG. 10 includes an illustration of a perspective view of a partially disassembled structure 1000 in accordance with another embodiment. A first bus bar 1010 and a second bus bar 1020 can be formed on the substrate 802 before forming any of the subsequent layers, and the third bus bar 1030, the fourth bus bar 1040, the fifth bus bar 1050, and the sixth bus bar 1060 can be formed on the layer 828 before the substrate 804 is joined with the substrate 802. Gaps can be present between the bus bars. During operation, the bus bars on the substrate 802 can be at a fixed potential, such as 0V, and the bus bars on the substrate 804 can have their voltages selected to achieve a desired light transmission state. In another embodiment, the bus bars on the substrate 804 can be at a fixed potential, such as 0V, and bus bars on the substrate 802 can have their voltages selected to achieve a desired light transmission state. In one embodiment, the voltage of the third bus bar 1030 is greater than the voltage of the fifth bus bar 1050 which is greater than the voltage of the fourth bus bar 1040, which is greater than the first bus bar 1010. In another embodiment, the voltage of the fourth bus bar 1040 is greater than the voltage of the fifth bus bar 1050 which is greater than the voltage of the third bus bar 1030 which is greater than the voltage of the first bus bar 1010.

Figure 11:
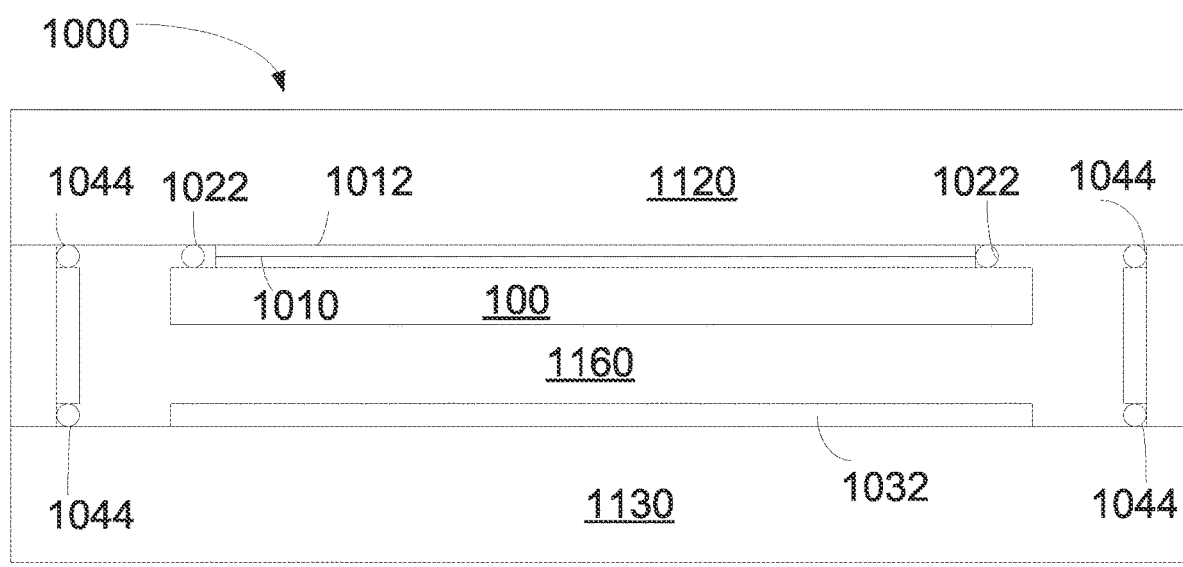
FIG. 11 includes an illustration of a cross-sectional of an insulated glass unit (IGU).

FIG. 11 includes an illustration of a cross-sectional of an insulated glass unit (IGU) 1100 that includes the substrate 100 and the electrochromic device 124 as illustrated in FIGS. 1, 2, and 3. The IGU 1100 further includes a counter substrate 1120 and a solar control film 1112 disposed between the electrochromic device 1110 and the counter substrate 1120. A seal 1122 is disposed between the substrate 100 and the counter substrate 1120 and around the electrochromic device 1110. The seal 1122 can include a polymer, such as polyisobutylene. The counter substrate 1120 is coupled to a pane 1130. Each of the counter substrate 1120 and pane 1130 can be a toughened or a tempered glass and have a thickness in a range of 2 mm to 9 mm. A low-emissivity layer 1132 can be disposed along an inner surface of the pane 1130. The counter substrate 1120 and pane 1130 can be spaced apart by a spacer bar 1142 that surrounds the substrate 100 and electrochromic device 124. The spacer bar 1142 is coupled to the counter substrate 1120 and pane 1130 via seals 1144. The seals 1144 can be a polymer, such as polyisobutylene. The seals 1144 can have the same or different composition as compared to the seal 1122. An adhesive joint 1150 is designed to hold the counter substrate 1120 and the pane 1130 together and is provided along the entire circumference of the edges of the counter substrate 1120 and the pane 1120. An internal space 1160 of the IGU 300 may include a relatively inert gas, such as a noble gas or dry air. In another embodiment, the internal space 1160 may be evacuated. The IGU can include an energy source, a control device, and an input/output (I/O) unit. The energy source can provide energy to the electrochromic device 124 via the control device. In an embodiment, the energy source may include a photovoltaic cell, a battery, another suitable energy source, or any combination thereof. The control device can be coupled to the electrochromic device and the energy source. The control device can include logic to control the operation of the electrochromic device. The logic for the control device can be in the form of hardware, software, or firmware. In an embodiment, the logic may be stored in a field programmable gate array (FPGA), an application-specific integrated circuit (ASIC), or another persistent memory. In an embodiment, the control device may include a processor that can execute instructions stored in memory within the control device or received from an external source. The I/O unit can be coupled to the control device. The I/O unit can provide information from sensors, such as light, motion, temperature, another suitable parameter, or any combination thereof. The I/O unit may provide information regarding the electrochromic device 124, the energy source, or control device to another portion of the apparatus or to another destination outside the apparatus.

Embodiments as illustrated and described above can allow a continuously graded electrochromic device to be maintained for nearly any period of time after switching transmission states is completed. Further designs can be useful to reduce power consumption, provide more flexibility, simplify connections, or combinations thereof. An electrochromic device can have a portion that is in a continuously graded transmission state and another portion with a substantially uniform transmission state. The precise point where transition between the continuously graded transmission state and the substantially uniform transmission state may be difficult to see. For example, the portion with the continuously graded transmission state can be fully bleached at one end and fully tinted at the other. The other portion may be fully bleached and be located beside the fully bleached end of the continuously graded portion, or the other portion may be fully tinted and be located beside the fully tint end of the continuously graded portion. Embodiments with discrete grading between portions may be used without deviating from the concepts described herein. For example, an electrochromic device can a portion near the top of a window that is fully bleached, and a remainder that is continuously graded from fully tinted transmission state closer to the top of the window to a fully bleached transmission state near the bottom of the window. Such an embodiment may be useful to allow more light to enter to allow better color balance within the room while reducing glare. In still another embodiment, an electrochromic device can be maintained in a continuously graded state without any portion maintained in a substantially uniform transmission state. Clearly, many different transmission patterns for an electrochromic device are possible.

Many different aspects and embodiments are possible. Some of those aspects and embodiments are described below. Exemplary embodiments may be in accordance with any one or more of the ones as listed below.

Embodiment 1. An apparatus can include an active stack. The active stack can include a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The apparatus can further include a first bus bar electrically coupled to the first transparent conductive layer, a second bus bar electrically coupled to the second transparent conductive layer, where the second bus bar is generally non-parallel to the first bus bar, and a third bus bar electrically coupled to the first transparent conductive layer, where the third bus bar is generally parallel to the first bus bar.

Embodiment 2. An apparatus can include an active stack. The active stack can include a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The apparatus can further include a first bus bar electrically coupled to the first transparent conductive layer, a second bus bar electrically coupled to the second transparent conductive layer, where the second bus bar is generally non-parallel to the first bus bar, a third bus bar electrically coupled to the first transparent conductive layer, where the third bus bar is generally parallel to the first bus bar, a fourth bus bar electrically coupled to the second transparent conductive layer, where the fourth bus bar is generally parallel to the second bus bar, and a fifth bus bar electrically coupled to the second transparent conductive layer, wherein the fifth bus bar is generally parallel to the first bus bar.

Embodiment 3. The apparatus of embodiment 1, further including a fourth bus bar electrically coupled to the second transparent conductive layer, where the fourth bus bar is generally parallel to the second bus bar.

Embodiment 4. The apparatus of any one of embodiments 1 or 2, where the active stack includes a first side, a second side opposite the first side, a third side generally non-parallel to the first side, and a fourth side parallel to the third side.

Embodiment 5. The apparatus of embodiment 4, wherein the second bus bar is closer to the third side of the active stack than the fourth side of the active stack.

Embodiment 6. The apparatus of embodiment 4, wherein the third bus bar is closer to the second side of the active stack than the first side of the active stack.

Embodiment 7. The apparatus of embodiment 4, wherein the fourth bus bar is closer to the fourth side of the active stack than the third side of the active stack.

Embodiment 8. The apparatus of embodiment 4, wherein the first bus bar is closer to the first side of the active stack than the second side of the active stack.

Embodiment 9. The apparatus of embodiment 4, wherein the fifth bus bar is closer to the first side of the active stack than the second side of the active stack.

Embodiment 10. The apparatus of embodiment 4, further including a sixth bus bar parallel to the fifth bus bar.

Embodiment 11. The apparatus of embodiment 10, wherein the sixth bus bar is closer to the third side of the active stack than the fourth side of the active stack Embodiment 12. The apparatus of embodiment 10, wherein the sixth bus bar is electrically coupled to the first transparent conductive layer.

Embodiment 13. The apparatus of embodiment 10, wherein the sixth bus bar is electrically coupled to the second transparent conductive layer.

Embodiment 14. The apparatus of embodiment 10, further including a seventh bus bar electrically coupled to the first transparent conductive layer, wherein the fifth bus bar is between the first bus bar and the seventh bus bar.

Embodiment 15. The apparatus of embodiment 14, wherein the seventh bus bar is closer to the first side of the active stack than the second side of the active stack.

Embodiment 16. The apparatus of embodiment 4, further comprising an eighth bus bar electrically coupled to the first transparent conductive layer.

Embodiment 17. The apparatus of embodiment 14, wherein the eighth bus bar is closer to the third side of the active stack than the fourth side of the active stack, wherein the sixth bus bar is between the third bus bar and the eighth bus bar.

Embodiment 18. The apparatus of embodiment 1, further including a first power supply terminal coupled to the first bus bar, a second power supply terminal coupled to the second bus bar, a third power supply terminal coupled to the third bus bar, a fourth power supply terminal coupled to the fourth bus bar, and a control device configured such that the second and fourth power supply terminals are at a same voltages and the first and third power supply terminals are at a different voltage during a same time period.

Embodiment 19. The apparatus of any one of embodiments 2 or 10 or 14 or 16, further including a fifth power supply terminal coupled to the fifth bus bar, a sixth power supply terminal coupled to the sixth bus bar, a seventh power supply terminal coupled to the seventh bus bar, an eighth power supply terminal coupled to the eighth bus bar, and a control device configured such that the first, the third, the sixth, the seventh, and the eighth power supply terminals are at a same voltage and the second, fourth, and fifth power supply terminals are at a different voltage during a same time period.

Embodiment 20. The apparatus of any one of embodiments 1 or 2, wherein the active stack further comprises an ion conducting layer between the cathodic electrochemical layer and the anodic electrochemical layer.

Embodiment 21. The apparatus of any one of embodiments 1 or 2, further comprising a substrate, wherein the first transparent conductive layer is between the substrate and the second transparent conductive layer.

Embodiment 22. The apparatus of any one of embodiments 1 or 2, wherein the second bus bar is orthogonal to the first bus bar.

Embodiment 23. The apparatus of any one of embodiments 1 or 2, wherein the first bus bar, second bus bar, and the third bus bar are on a first substrate.

Embodiment 24. The apparatus of embodiment 21, further including a first panel and a laminate between the first panel and the substrate.

Embodiment 25. The apparatus of embodiment 24, further including a second panel and a spacer between the first panel and the second panel.

Embodiment 26. The apparatus of embodiment 17, further including a first zone, a second zone, and a third zone, wherein the second zone is in a graded transmission state.

Embodiment 27. A method of operating an apparatus including providing an electroactive device. The electroactive device including an active stack. The active stack including a first transparent conductive layer, a second transparent conductive layer, an anodic electrochemical layer between the first transparent conductive layer and the second transparent conductive layer, and a cathodic electrochemical layer between the first transparent conductive layer and the second transparent conductive layer. The apparatus also including a first bus bar electrically coupled to the first transparent conductive layer, a second bus bar electrically coupled to the second transparent conductive layer, wherein the second bus bar is non-parallel to the first bus bar, and a third bus bar electrically coupled to the first transparent conductive layer, wherein the third bus bar is parallel to the first bus bar. The method of operating the apparatus also including switching the electrochromic device from a first transmission state to a graded transmission state, wherein switching the electrochromic device comprises biasing the first bus bar to a first voltage and biasing the second bus bar to a second voltage different from the first voltage and maintaining the graded transmission state.

Embodiment 28. The method of embodiment 27, wherein switching the electrochromic device further comprises biasing the third bus bar to a third voltage different from the second voltage and biasing the fourth bus bar to a fourth voltage different from the first voltage and different from the second voltage.

Embodiment 29. The method of embodiment 28, wherein the third voltage is less than the second voltage.

Embodiment 30. The method of embodiment 28, wherein the second voltage is greater than the first voltage.

Embodiment 31. The method of embodiment 28, wherein the fourth voltage is less than the second voltage.

Embodiment 32. The method of embodiment 28, wherein the third voltage is greater than the second voltage.

Embodiment 33. The method of embodiment 28, wherein the fourth voltage is greater than the first voltage.

Embodiment 34. The method of embodiment 27, wherein the electroactive device further including a first power supply terminal coupled to the first bus bar, a second power supply terminal coupled to the second bus bar, a third power supply terminal coupled to the third bus bar, a fourth power supply terminal coupled to the fourth bus bar, and a control device configured such that the second and fourth power supply terminals are at a voltages less than the first power supply and the first and third power supply terminals are at a different voltage during a same time period.

Embodiment 35. The method of embodiment 27, wherein the electroactive device further comprises a fourth bus bar electrically coupled to the second transparent conductive layer, wherein the fourth bus bar is parallel to the second bus bar.

Embodiment 36. The method of embodiment 27, wherein the graded transmission state is a continuously graded transmission state.

Note that not all of the activities described above in the general description, or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of operating an apparatus comprising:
providing an electroactive device, the electroactive device comprising:
a substrate with a first side, a second side parallel to the first side, a third side orthogonal to the first side, and a fourth side orthogonal to the first side and parallel to the third side;
a first transparent conductive layer;
a second transparent conductive layer; wherein an isolation cut for the first transparent conductive layer is non-parallel to an isolation cut for the second transparent conductive layer;
an anodic electrochemical layer between the first transparent conductive layer and
the second transparent conductive layer; and
a cathodic electrochemical layer between the first transparent conductive layer and the second transparent conductive layer;
a first bus bar electrically coupled to the first transparent conductive layer, wherein the first bus bar runs along the first side and is closer to the first side than the second side;
a second bus bar electrically coupled to the second transparent conductive layer, wherein the second bus bar is non-parallel to the first bus bar, and wherein the second bus bar runs along the third side and is closer to the third side than the fourth side; and a third bus bar electrically coupled to the first transparent conductive layer, wherein the third bus bar is parallel to the first bus bar;
switching the electrochromic device from a first transmission state to a graded transmission state, wherein switching the electrochromic device comprises biasing the first bus bar to a first voltage and biasing the second bus bar to a second voltage different from the first voltage; and
maintaining the graded transmission state.

2. The method of claim 1, wherein the electroactive device further comprises a fourth bus bar electrically coupled to the second transparent conductive layer, wherein the fourth bus bar is generally parallel to the second bus bar.

3. The method of claim 2, wherein the second bus bar is closer to the third side of the substrate than the fourth side of the substrate.

4. The method of claim 2, wherein switching the electrochromic device further comprises biasing the third bus bar to a third voltage different from the second voltage; and biasing the fourth bus bar to a fourth voltage different from the first voltage and different from the second voltage.

5. The method of claim 1, wherein the third voltage is less than the second voltage.

6. The method of claim 4, wherein the second voltage is greater than the first voltage and the fourth voltage is less than the second voltage.

7. The method of claim 4, wherein the third voltage is greater than the second voltage and the fourth voltage is greater than the first voltage.

8. The method of claim 1, wherein the graded transmission state is a continuously graded transmission state.

9. The method of claim 1, wherein the third bus bar is closer to the second side of the substrate than the first side of the substrate.

10. The method of claim 2, wherein the fourth bus bar is closer to the fourth side of the substrate than the third side of the substrate.

11. The method of claim 1, further including a first zone, a second zone, and a third zone, wherein the second zone is capable of being in a graded transmission state.

12. The method of claim 1, wherein the electroactive device further comprises:
a first power supply terminal coupled to the first bus bar;
a second power supply terminal coupled to the second bus bar;
a third power supply terminal coupled to the third bus bar;
a fourth power supply terminal coupled to the fourth bus bar; and
a control device configured such that the second and fourth power supply terminals are at a same voltage and the first and third power supply terminals are at a different voltage during a same time period.

13. A method of operating an apparatus comprising:
providing an electroactive device, the electroactive device comprising:
a substrate;
a first transparent conductive layer;
a second transparent conductive layer; wherein an isolation cut for the first transparent conductive layer is non-parallel to an isolation cut for the second transparent conductive layer;
an anodic electrochemical layer between the first transparent conductive layer and the second transparent conductive layer; and
a cathodic electrochemical layer between the first transparent conductive layer and the second transparent conductive layer;
a first bus bar electrically coupled to the first transparent conductive layer;
a second bus bar electrically coupled to the second transparent conductive layer, wherein the second bus bar is non-parallel to the first bus bar; and
a third bus bar electrically coupled to the first transparent conductive layer, wherein the third bus bar is parallel to the first bus bar;
switching the electrochromic device from a first transmission state to a graded transmission state, wherein switching the electrochromic device comprises biasing the first bus bar to a first voltage and biasing the second bus bar to a second voltage different from the first voltage; and
maintaining the graded transmission state.

14. The method of claim 13, wherein the electroactive device further comprises a fourth bus bar electrically coupled to the second transparent conductive layer, wherein the fourth bus bar is generally parallel to the second bus bar.

15. The method of claim 13, wherein the substrate comprises a first side, a second side parallel to the first side, a third side orthogonal to the first side, and a fourth side orthogonal to the first side and parallel to the third side.

16. The method of claim 15, wherein the first bus bar is closer to the first side than the second side, and the third bus bar is closer to the third side than the fourth side.

17. The method of claim 15, wherein the electroactive device further comprises a fifth bus bar electrically coupled to the second transparent conductive layer, wherein the fifth bus bar is generally parallel to the first bus bar.

18. The method of claim 17, wherein the electroactive device further comprises a sixth bus bar electrically coupled to the first transparent conductive layer, wherein the sixth bus bar is generally parallel to the first bus bar, and wherein the fifth bus bar is between the first bus bar and the sixth bus bar.

19. The method of claim 15, wherein the electroactive device further comprises a seventh bus bar electrically coupled to the second transparent conductive layer, wherein the seventh bus bar is generally parallel to the third bus bar, and wherein the seventh bus bar is closer to the second side of the substrate than the first side of the substrate.

20. The method of claim 19, wherein the electroactive device further comprises an eighth bus bar electrically coupled to the first transparent conductive layer, wherein the eighth bus bar is generally parallel to the third bus bar, and wherein the seventh bus bar is between the third bus bar and the eighth bus bar along the second side of the substrate.

* * * * *